United States Patent

Wunning

[11] Patent Number: 6,033,208
[45] Date of Patent: Mar. 7, 2000

[54] REGENERATOR BURNER

[76] Inventor: Joachim Wunning, Berghalde 20, D-71229 Leonberg, Germany

[21] Appl. No.: 09/151,917

[22] Filed: Sep. 11, 1998

[51] Int. Cl.[7] ............................. F23D 14/66; F24C 3/00
[52] U.S. Cl. ........................ 431/215; 431/11; 431/166; 126/91 A; 432/180
[58] Field of Search .......................... 431/11, 215, 115, 431/116, 166, 167; 126/91 A; 432/180, 175

[56] References Cited

FOREIGN PATENT DOCUMENTS

| 0293168 | 5/1988 | European Pat. Off. . |
| 293168 | 5/1988 | European Pat. Off. . |
| 463218 | 6/1990 | European Pat. Off. . |
| 0685683 | 5/1995 | European Pat. Off. . |
| 685683 | 5/1995 | European Pat. Off. . |
| 07151223 | 10/1995 | European Pat. Off. . |
| 0732542 | 9/1996 | European Pat. Off. . |
| 4420477 | 10/1995 | Germany . |
| 6-11121 | 6/1992 | Japan . |
| 540797 | 10/1941 | United Kingdom . |

*Primary Examiner*—Carl S. Price
*Attorney, Agent, or Firm*—Leydig, Voit & Mayer, Ltd.

[57] ABSTRACT

A regenerator burner for particular use in the heating of furnace spaces of industrial furnaces is provided. The regenerator burner includes an outer tube in which a central fuel feed arrangement is provided and a burner head which contains combustion air feed and combustion exhaust gases lead-off arrangements and from which the outer tube extends. Two regenerators each of which can be acted on with combustion air and with combustion exhaust gases are also provided. The two regenerators are arranged in two annular spaces which are coaxial to the fuel feed arrangement and are positioned radially one within the other with the annular spaces extending at least over a portion of their axial length in surrounding relation to the fuel feed arrangement in the outer tube. A nozzle mechanism being allocated to each of the two annular spaces at an end of the regenerator burner opposite the burner head. The nozzle mechanisms are operable alternately as inlet and outlet nozzles.

12 Claims, 2 Drawing Sheets

REGENERATOR BURNER

FIELD OF THE INVENTION

This invention generally relates to regenerator burners and, more particularly, to a regenerator burner for the heating of furnaces spaces of industrial furnaces.

BACKGROUND OF THE INVENTION

Regenerator burners generally are industrial burners which operate with regenerative air preheating. Further, regenerative burners, as a rule, operate with two integrated regenerators which are alternately acted upon by hot combustion waste gases and by cold combustion air in counterflow operation. Such regenerator burners make it possible to achieve a higher air preheating than so-called recuperator burners, i.e. industrial burners that have a built-in recuperator. The relative air preheating achievable in regenerator burners amounts to up to 90%, i.e. with an exhaust gas entry temperature of, for example, 1000° C. the combustion air can be preheated to approximately 900° C.

Because of the high air preheating, industrial burners with integrated regenerators operate with a very good efficiency, however, as a rule, they require measures for the reduction of $NO_x$.

An example of such a regenerator burner is described in applicant's EP 0 685 683 A3. With this regenerator burner, a single coaxially traversed regenerator is provided in an annular space coaxially surrounding the fuel lance, the heat storage elements of the regenerator consist of individual ceramic regenerator disks which are stacked on one another. A ceramic combustion chamber is engaged on the outlet side of the regenerator which issues—over a nozzle the cross section of which is approximately cloverleaf—into the furnace chamber and in which gas and air are burned until the ignition temperature in the furnace space (approximately 800° C.) is achieved. Once the ignition temperature is achieved, the gas feed for the combustion in the furnace space is switched over. Since the regenerator burner is equipped only with one regenerator, it is thereupon operated step-wise in two operating cycles. During a first operating cycle, the burner's regenerator is traversed by hot exhaust gases from the furnace with shut-off fuel and combustion air feed, these exhaust gases heating up the heat storage elements of the regenerator. As soon as the regenerator is heated up, the second operating cycle is initiated by a corresponding switch-over of an exhaust-gas and combustion air valve. In the second operating cycle, the heat storage disks of the regenerator are traversed in a reversed direction by the combustion air and thereupon the combustion air is preheated before its entry into the combustion chamber and from there into the furnace space. Because of this cyclic operation, in practice, at least two regenerator burners of this type which are driven in pairs so as to be acted upon alternately with combustion and furnace exhaust gas are required. In many cases, the arrangement of the two burners does not cause any trouble—for example with direct heating or with jet tubes having two shanks as is also explained in this reference. A similar arrangement having two generator burners, the regenerators of which clearly lie outside of the furnace wall, is described in EP 0 293 168 A2.

With another regenerator burner disclosed in applicant's EP 0 463 218 A3, the arrangement is constructed in such a way that 6 regenerator cartridges that lie in the opening of the furnace wall receiving the burner are arranged radially spaced about a coaxial air conducting cylinder enclosing the fuel lance. Each of the regenerator cartridges comprises a number of ceramic storage stones containing continuous flow channels are stacked one over another and arranged one after another for the flow. The regenerator cartridges are provided in each case with a tubular outer mantel of sheet steel which receives the storage stones and on which there is connected, on the side facing the furnace space, a nozzle chamber in the bottom wall of which, in each case, two nozzles are arranged. All the nozzles of the regenerator cartridges lie on an imaginary circle, coaxial to the fuel lance, in which adjacent nozzles have an equal axial spacing. The nozzle chambers of the regenerator cartridges enclose a ceramic combustion chamber which is connected to the air-conducting cylinder and into which the fuel lance discharges. The combustion chamber makes it possible to achieve the necessary ignition temperature of approximately 800° C. in the furnace space. The regenerator cartridges are operated group-wise in one of two operating cycles. In one operating cycle, the regenerator cartridges are traversed and heated up by the hot combustion exhaust gases, while in the other operating cycle regenerator cartridges give off the stored heat to the cold combustion air traversing them. Between the cylindrical regenerator cartridges a considerable unused gusset volume remains, so that the heat storage capacity of the regenerators is limited.

A fundamentally similar problem also applies, finally, for a regenerator burner described in EP 0 715 123 A2. With this regenerator burner, the two regenerators are arranged within a tube coaxial to the central fuel lance and are formed in one embodiment by a number of regenerator cartridges lying on a common imaginary circle, and in another embodiment the regenerator cartridges are arranged in an annular space which is coaxial to the fuel lance and is subdivided by the radial partition walls. The sector-form subdivisions contain the heat storage elements stacked one upon another and which in one example comprise ceramic honeycomb stones. The alternating action of hot combustion gases or cold combustion air on the two regenerators occurs through a valve arrangement which has two perforated disks which are turnable against one another. While with the embodiment with the regenerator cartridges arranged in wreath form there is significant unused gusset volume, production of the second embodiment is complicated if the cylindrical tube receiving the heat storage elements and the radial partition walls installed in this tube are made of a ceramic material. In particular, sealing problems arise along with other problems.

OBJECTS AND SUMMARY OF THE INVENTION

Accordingly, in view of the foregoing, it is a general object of the invention to provide an industrial burner with regenerative air preheating, i.e. a so-called regenerator burner, having a high heat storage capacity.

An additional object of the invention is to provide a regenerator burner as characterized above which can be operated with a relatively low $NO_x$ emission.

A more specific object of the invention is to provide a regenerator burner of the foregoing type which has regenerators arranged within a cylindrical outer tube in a relatively simple construction.

In the generator burner of the present invention, the two regenerators are arranged in concentric relation in two annular spaces surrounding the fuel supply. The two annular spaces are arranged, at least over a part of their axial length, lying radially within one another and within an outer cylindrical tube which surrounds the annular spaces. As is typical, the combustion air and the combustion gas are periodically switched over to the two regenerators. The switch-over valve which enables the periodic switching over of combustion air and combustion exhaust gas is typically located directly on the burner head.

On the end of the burner arranged opposite the burner head, nozzles are allocated to both of the annular spaces which receive the regenerators. These nozzles are operable alternately as inlet and outlet nozzles. Additionally, these nozzles have a number of annularly distributed nozzle openings which lie with their central axes at least approximately on an imaginary circle concentric to the fuel feed arrangement and which, if necessary in groups, can communicate with the heat storage elements of either regenerator. In a preferred embodiment, the nozzle openings can be bounded by an essentially meander-shaped nozzle ring, which is connected to a tube coaxial with at least of one of the two regenerators.

Between the nozzles and at least the radially inwardly positioned regenerator there is appropriately arranged a combustion chamber into which a fuel feed arrangement leads for particular use in the starting operation. In the heating-up operation, e.g., when the furnace temperature is below about 800° C., the combustion gas is fed to the combustion chamber, while the corresponding regenerator is acted upon with combustion air. This results obviously in a fifty percent reduction in performance during the time period in which the furnace chamber is brought to operating temperature. In practice, however, this is in many cases acceptable. If necessary, however, the outer regenerator can also be equipped with an annular combustion chamber and its own combustion gas feed so as to enable complete performance during the heating-up phase. Of course, with such an arrangement a second ignition and monitoring arrangement is also necessary, which entails a certain expenditure.

A substantial further advantage of the concentric arrangement of the two regenerators lies in the possibility of making the tubes receiving the ceramic heat storage elements, the combustion chamber, the nozzles, and other parts which may be exposed to high temperatures of high temperature-fast, thin-walled ceramic material. If the nozzles include the substantially meander-formed nozzle ring described above, the nozzle ring can be produced in a simple manner from thin-walled ceramic material and be mounted in the allocated coaxial tube through a simple plug-in assembly which also enables the installation in the nozzle ring a cover part which bounds the nozzle openings in the radially inward direction. Through a symmetrical alternating arrangement of the inlet and outlet nozzle openings of the two regenerators toward the furnace space, a good recirculation of the combustion gases in the furnace space or in a jet tube is achieved on a circular ring about the central fuel feed arrangement (for example, a gas lance).

The regenerator burner of the present invention is particularly suited for use with an end-side closed oneshackle mantle tube, a so-called mantle jet heating tube. It can, however, also be used for the direct heating of a furnace space. In particular, the arrangement is made in such a way that with a regenerator burner installed into a corresponding opening of the wall of the furnace space the nozzles present in the area of the inside positioned wall side discharge freely into the furnace space.

The two regenerators of the new regenerator burner advantageously contain annular heat storage elements which have axially traversable channels. In order to avoid an uncontrolled breakage caused by differing heat expansion, etc., the annular heat storage elements can be divided into sector-form annular segments which are arranged adjacent to one another.

These and other features and advantages of the invention will be more readily apparent upon reading the following description of a preferred exemplary embodiment of the invention and upon reference to the accompanying drawings wherein:

Figure 1:
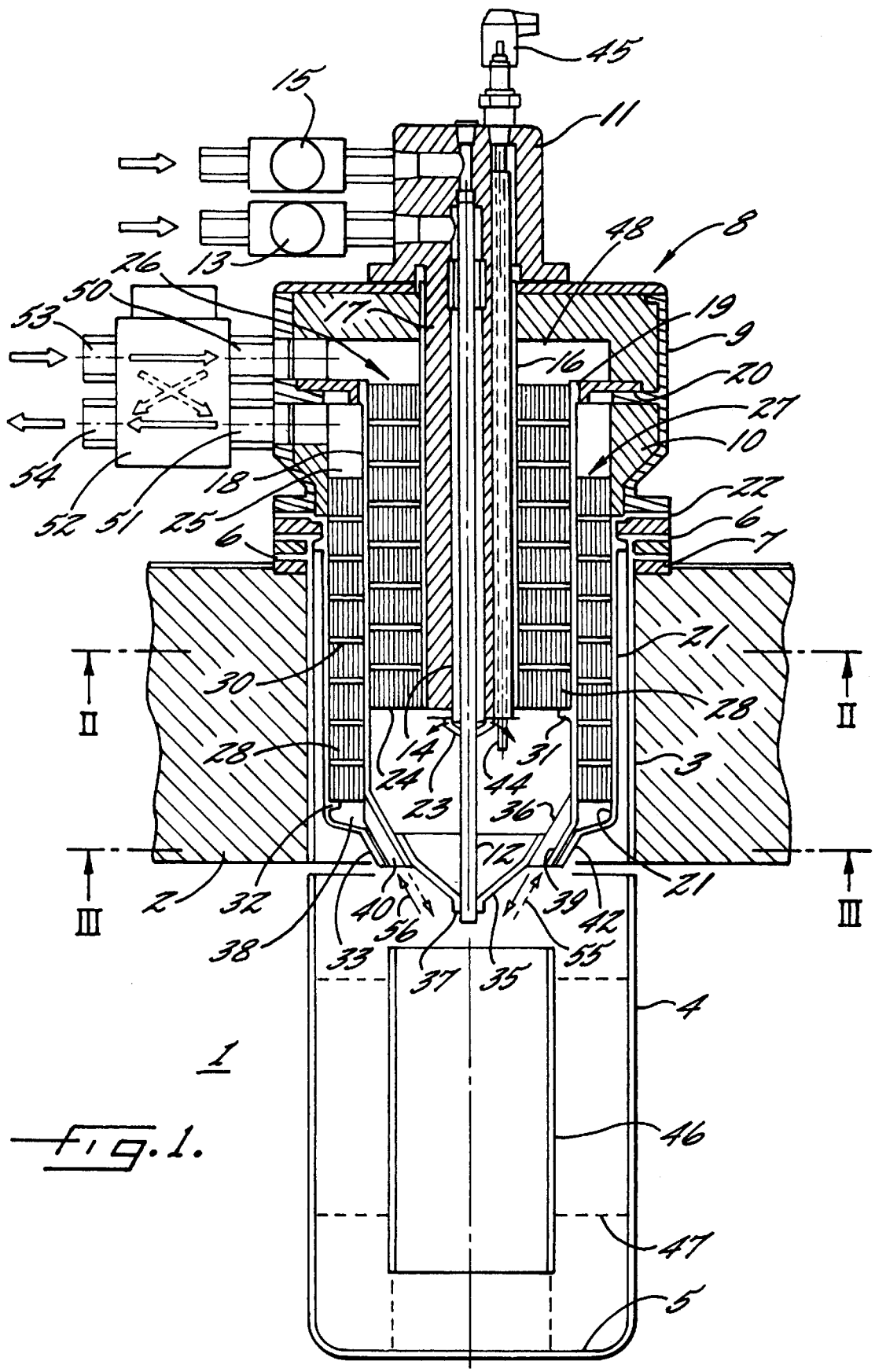
FIG. 1 is a schematic axial cross section taken in the plane I—I of FIG. 3 of an illustrative generator burner according to the invention.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

The exemplary regenerator burner illustrated in the drawings serves for the heating of a furnace space 1 which is bounded by a furnace wall 2 represented in section, which has a continuous cylindrical opening 3. In the opening 3 there is installed and sealed off a ceramic mantle jet heating tube 4, which is closed at its portion which extends into the furnace space 1 on one side 5 and which is supported over molded-on annular flanges 6 and interlayers 7 against the outside of the furnace wall 2.

On the mantle jet heating tube 4 there is arranged on the outside of the furnace wall 2 a coaxial burner head 8, the steel housing 9 of which is lined internally with heat insulating material 10. On the burner head there is seated a fuel distributor 11 from which there issues a fuel lance 12 which extends in coaxial relation into the mantle jet heating tube 4 and forms the fuel feed arrangement and to which via a valve 13 fuel, typically natural gas or the like, can be supplied. A fuel feed tube 14, which is shorter than the fuel lance 12, also extends from the fuel distributor 11 and surrounds the fuel lance 12 in radial spaced relation thereto. Fuel (e.g., natural gas or the like) can be supplied to the fuel feed tube 14 via a valve 15.

The fuel feed tube 14 is surrounded by a cylindrical inner tube 16 in radial spaced relation thereto which consists of a thin-walled ceramic material and is installed, with one end sealed off, into the burner head 8. The inner tube 16 is insulated against the fuel feed tube 14 by poor heat conductive, high temperature-fast ceramic material 17.

The inner tube 16 is also surrounded at a relatively larger radial spacing by a second coaxial tube 18 consisting of thin-walled ceramic material, which is fastened at 19 on end side to an annular flange 20, over which it is supported on burner head 8. Arranged in coaxial relation to the second ceramic tube 18 is an outer cylindrical tube 21 likewise consisting of thinwalled ceramic material, which is connected at its end with an annular flange 22 on which it is supported on the burner head 8.

Figure 2:
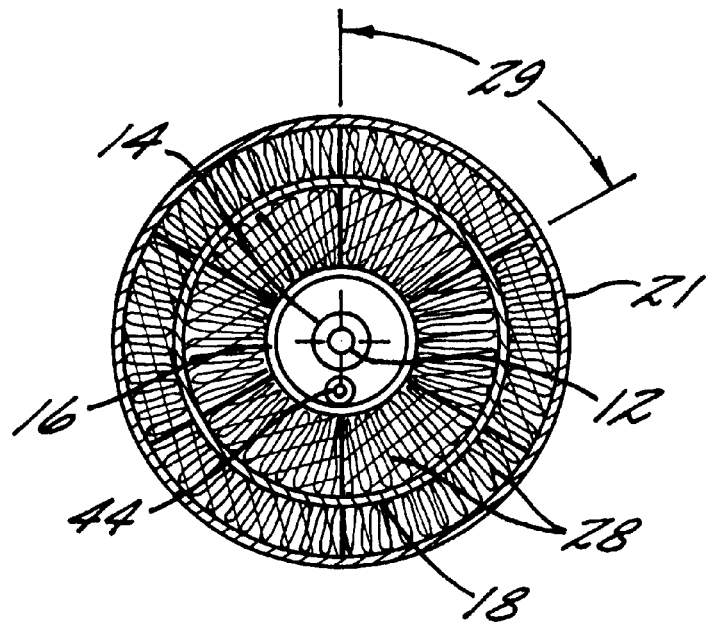
FIG. 2 is a plan view of a cross-section of the regenerator burner of FIG. 1 taken in the plane of line II—II of FIG. 1.

Between the inner tube 16, the second coaxial tube 18, and the outer tube 21, which, as shown in FIG. 1, extends in radial spaced relation from the mantle jet heating tube 4, there are two concentric annular spaces 24, 25, which are formed in coaxial relation to the fuel lance 12 so as to be radially within one another. In the annular spaces 24, 25 there are arranged two regenerators 26, 27, each of which contains annular heat storage elements 28 which consist of ceramic material and the structure of which, in particular, is also shown in FIG. 2.

The annular heat storage elements 28 have axially continuous channels having an inside diameter of approximately 2 mm. They are subdivided into sectors or annular segments 29, which are arranged in abutting relation to each other in the circumferential direction. Thus, an uncontrolled breakage arising from thermally conditioned tensions can be prevented. In the axial direction, the annular heat storage elements 28 are separated from one another by small internal spaces 30, which are defined by spacer pieces (not shown). Furthermore, the heat storage elements 28 are in each case arranged on a border strip 22 of the second coaxial tube 18 and of the outer tube 21 as is shown in FIG. 1 with reference numbers 31 and 32. As also shown in FIG. 1, the two regenerators 26, 27 overlap one another within the furnace wall 2 over a considerable part of their axial length with the radial outwardly positioned regenerator 27 being received firmly over its entire axial length in the outer tube 21, while the radially inwardly positioned regenerator 26 extends about half way into the interior space of the burner head 8.

Figure 3:
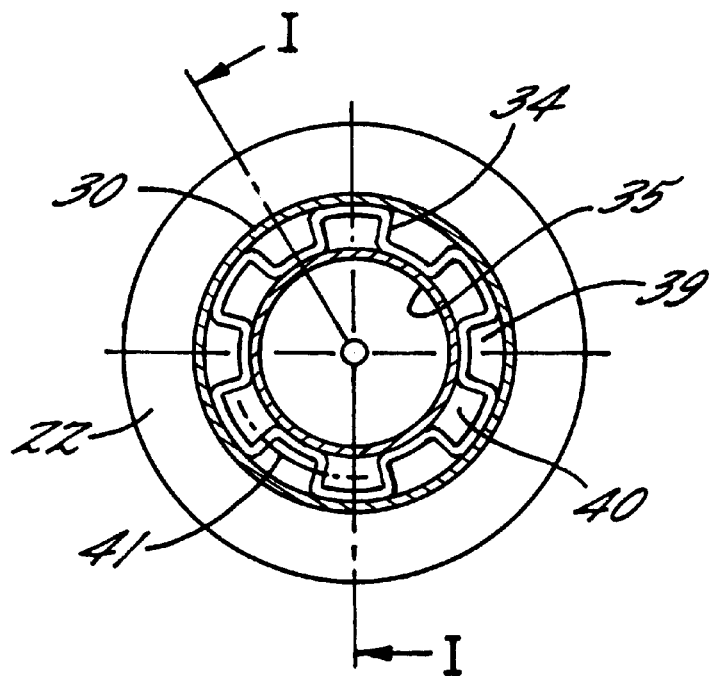
FIG. 3 is a plan view of a cross-section of the regenerator burner of FIG. 1 taken in the plane of line III—III of FIG. 1.

The outer tube 21 has a funnel shaped portion 33 on the side which faces the furnace space 1 such that the outer tube presents a conical mantle surface tapering toward the furnace space 1. On the funnel-shaped portion 33 of the outer tube 21, a nozzle ring 34 (FIGS. 1 and 3) is arranged internally. The nozzle ring 34 is folded essentially in meander form and, on its outer circumference surface, in correspondence to the slope of the inner wall of the funnel shaped tapered portion 33. The nozzle ring 34 extends in the axial direction up to the second tube 18, onto which it applies itself internally, as shown in FIG. 1. A pot-shaped or cap-shaped closure cover 35 is inserted in the nozzle ring 34. The closure cover 35 is supported on the conically constructed inner wall 36 of the nozzle ring 34 having a circumferential area having a corresponding cone angle and which protrudes in the axial direction beyond the nozzle ring 34 into the furnace space 1. The cover 35 has a central opening 37 through which the fuel lance 12 is led.

In the axial direction relative to the fuel lance 12, the cover 35 extends over only about half the axial height of the nozzle ring 34, about up to an annular space 38 positioned underneath the heat storage elements 28 of the radially outwardly positioned regenerator 27, bounded by the tubes 18, 21. In the area of the nozzle ring 34, channel-type nozzle openings 39, 40 are bounded externally by the funnel-shaped tapered portion 33 of the outer tube 21 and internally by the cover 35, The nozzle openings 39, 40 are approximately trapezoidal in cross section and are positioned with their center points in an imaginary circle coaxial to the fuel lance 12, as shown at reference number 41 in FIG. 3. The nozzle openings 39, 40 are directed with their axes obliquely, radially inward to the furnace space 1 and thus are distributed symmetrically and uniformly around the fuel lance 12. The nozzle openings 39 issue into the annular space 38 of the radially outwardly positioned regenerator 27, while the adjacently lying nozzle openings 40 lead into a combustion chamber 42 coaxial to the fuel lance 12. The combustion chamber is bounded by the tube 18, the nozzle ring 34 and the cover 35. The combustion chamber 42 there issues, in the area immediately under the radially inwardly positioned regenerator 26, the fuel feed tube 14 which, together with a bounce plate 43 arranged on the fuel lance 12, bounds a nozzle-type fuel outlet. Positioned to the side of the fuel lance 12 led through the combustion chamber 42, an ignition electrode 44 with allocated ionization monitoring leads into the combustion chamber 42. the electrical connecting arrangement 45 which is allocated to the ignition electrode is seated on the fuel distributor 11.

A coaxial ceramic flame tube 46, which is held in place by thin crosspieces 47, is arranged in the axial spacing of the mouth of the fuel lance 12 and the cover 35 in the mantle jet heating tube 4.

In the burner head 8, two annular spaces 48, 25 are formed axially spaced from one another by the annular flange 20, of which the annular space 48 communicates with the radially inwardly positioned regenerator 26, and the annular space 25 communicates with the radially outwardly positioned regenerator 27. Into the annular spaces 48, 25 there issue inlet/outlet channels 50, 51 which can be connected via a switch-over valve arrangement 52 as desired with a combustion air feed channel 53 or with a combustion air exhaust channel 54.

The regenerator burner described operates fundamentally in the manner described in applicant's EP 0 463 218 A3 or EP 0 685 683 A3:

Proceeding from the cold rest state, first in the starting operation, fuel and combustion air are supplied to the furnace chamber 42 over the fuel feed tube 14 and the radially inwardly arranged regenerator 26. The air/fuel mixture is ignited by the ignition electrode 44 and burned. The hot combustion gases pass through the nozzle openings 39 into the mantle jet heating tube 4, sweep the inner wall of the latter and are led off over the nozzle openings 40, the annular space 38, the radially outwardly arranged regenerator 26 and the combustion gas lead-off 54. As soon as the ignition temperature (approximately 800° C.) is reached in the mantle jet heating tube 4, the fuel feed via the fuel feed tube 14 is shut off and switched over to the fuel lance 12 issuing outside of the combustion chamber 42 (valves 13/15). The fuel emerging from the fuel lance 12 (typically gas) is oxidized in the flame tube 46 and in the area positioned between the latter and the cover 35 acting as air conducting cone for the air jets emerging from the nozzle openings 39, in which process there occurs simultaneously an intensive thorough mixing with the hot exhaust gases intensively circulated by the impulse action emerging from the nozzle openings 39. The exhaust gases cooled by the heat delivery over the mantle jet heating tube 4 into the furnace space 1 flow off over the nozzle openings 40 serving as outlet nozzles through the radially outwardly positioned regenerator 27 and the combustion gas lead-off 54, during which process the ceramic heat storage elements 28 of the regenerator 27 are heated up.

As soon as the regenerator 27 is fully heated, the valve arrangement 52 switches over such that the combustion air now traverses the hot regenerator 27 and is preheated, while the hot combustion gases, over the nozzle openings 39 now serving as inlet nozzles and over the combustion chamber 42, now flow through the radially inwardly arranged regenerator 26 and heat up its ceramic heat storage elements 28.

The nozzle openings 39, 40 of the nozzle ring 34 operate, therefore, at regular intervals as inlet-and-outlet nozzles as is indicated by arrows in FIG. 1, of which the arrows 55 illustrate the alternating flow-through of the nozzle openings 39, and the arrows 56 illustrate the alternating flow-through of the nozzle openings 40.

The generator burner represented in FIG. 1 operates with an end-side closed mantle jet heating tube 4, which like the flame tube 46 and the tubes 16, 18, 21 as well as the nozzle ring 34 and the cover 35, consist of a thin-walled ceramic material with a wall thickness typically of approximately 2 to 5 mm. In principle, however, the generator burner can also be used for the direct heating of the furnace space 1, in which case the mantle jet heating tube 4 is then eliminated. Otherwise the arrangement remains fundamentally as shown in FIG. 1.

In the described starting operation, in which over the fuel feed tube 14 fuel is brought into the combustion chamber 42 and this is acted upon exclusively over the radially inside-lying regenerator 26 with combustion air, the regenerator burner operates in the illustrated embodiment only with half power. This, typically, is not a disadvantage.

If necessary, however, the radially outwardly positioned regenerator 27 can also be used during the starting operation. For this purpose, the annular space 38 can be used as annular combustion chamber, for which purpose it is equipped with a fuel feed arrangement (not shown) and an ignition device.

What is claimed is:

1. A regenerator burner for particular use in the heating of furnace spaces of industrial furnaces comprising:

an outer tube in which a central fuel feed arrangement is provided, a burner head which contains combustion air feed and combustion exhaust gases lead-off arrangements and from which the outer tube extends, two regenerators each of which can be acted on with combustion air and with combustion exhaust gases, the two regenerators being arranged in two annular spaces which are coaxial to the fuel feed arrangement and are positioned radially one within the other, the annular spaces extending at least over a portion of their axial length in surrounding relation to the fuel feed arrangement in the outer tube, and a nozzle mechanism allocated to each of the two annular spaces at an end of the regenerator burner opposite the burner head, the nozzle mechanisms being operable alternately as inlet and outlet nozzles.

2. The regenerator burner according to claim 1, wherein each of the two regenerators contains annular heat storage elements which have axially traversable channels.

3. The regenerator burner according to claim 2, wherein the annular heat storage elements are divided into sector shaped annular segments.

4. The regenerator burner according to claim 1, wherein the regenerator burner is installed in a corresponding opening of a wall of a furnace space and the regenerators are arranged at least partially in the area of the furnace wall.

5. The regenerator burner according to claim 1, wherein the nozzle mechanisms have a number of annularly distributed nozzle openings having central axis which are positioned approximately on an imaginary circle concentric to the fuel feed arrangement and which alternately are connected with the heat storage elements either of the regenerators.

6. The regenerator burner according to claim 5, wherein the nozzle openings are bounded by a substantially meander shaped nozzle ring which is connected with a coaxial tube of at least one of the two regenerators.

7. The regenerator burner according to claim 6, wherein a cover part is installed in the nozzle ring, the cover part bounding the nozzle openings in a radially inward direction.

8. The regenerator burner according to claim 1, wherein a combustion chamber is installed between the nozzle mechanisms and at least the radially inwardly arranged regenerator and a second fuel feed arrangement leads into the combustion chamber for the starting operation.

9. A regenerator burner according to claim 1, wherein at least the outer tube receiving the nozzle mechanisms and the ceramic storage elements of the regenerators comprise thin-walled ceramic material.

10. A regenerator burner according to claim 1, wherein the regenerator burner is installed in a corresponding opening of a wall of a furnace space and the nozzle mechanisms arranged in the area of the inside of the wall are arranged to freely discharge into the furnace space.

11. The regenerator burner according to claim 1, further including a mantle jet heating tube into which the nozzle mechanisms discharge.

12. The regenerator burner according to claim 11, wherein the mantle jet heating tube consists of a thin-walled ceramic material.

* * * * *